March 25, 1969    KEEZI KANEKO    3,434,782
FILM MAGAZINE FOR MOTION PICTURE CAMERAS Filed Jan. 25, 1965    Sheet 1 of 2

INVENTOR.
KEEZI KANEKO
BY
Buckman and Archer
HIS ATTORNEYS

United States Patent Office 3,434,782
Patented Mar. 25, 1969

3,434,782
FILM MAGAZINE FOR MOTION PICTURE CAMERAS
Keezi Kaneko, Minamiashigara-machi, Ashigarakami-gun, Japan, assignor to Fuji Shashin Film Kabushiki Kaisha, Minamiashigara-machi, Ashigarakami-gun, Japan, a corporation of Japan
Filed Jan. 25, 1965, Ser. No. 427,733
Int. Cl. G03b 23/02; G01j 1/00, 1/52
U.S. Cl. 352—72        3 Claims

ABSTRACT OF THE DISCLOSURE

An automatic exposure control motion picture camera wherein grooves on the film magazine cooperate with mechanism in the camera when the cover of the camera is locked, in order to develop an electric circuit for the exposure control system specifically adapted to the sensitivity of the film within the magazine.

---

The present invention relates to a film magazine for motion picture cameras having a means for adjusting the automatic exposure control system automatically in accordance with film sensitivity.

Obviously, it is desirable to provide an automatic means on the film magazine for adjusting the automatic exposure control system of the movie camera in accordance with film sensitivity.

The present invention has as an object the provision of a film magazine for motion picture cameras which has a means for automatically adjusting the automatic exposure control system of the camera in accordance with film sensitivity.

In the present invention, the above-mentioned object is attained by providing on either or both surfaces of a film magazine one or more grooves, of which the length corresponds to film sensitivity; and which grooves co-operate with a movable pin in the automatic exposure system of the motion picture camera.

In one aspect of the present invention, the groove or grooves are of arcuate shape which is preferably concentric with the film spool in the magazine, and in another aspect, said groove or grooves are of rectilinear shape. In such cases where the present invention is employed in a magazine containing a double track film, it is preferable to provide the grooves on both magazine surfaces.

In order that the present invention may be more clearly understood and readily carried into effect, reference may now be had to the accompanying drawings in which several forms of the present invention are illustrated by way of example, and in which.

Figures 1, 2:
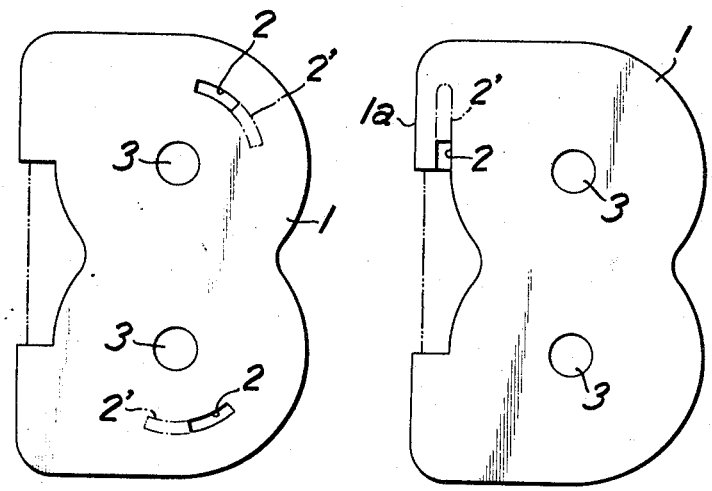
FIG. 1 is a plan view of a film magazine embodying the present invention.
FIG. 2 is a plan view of another embodiment of the present invention.

Referring now to the drawings, particularly to FIG. 1, the magazine 1 has two arcuate grooves 2, each of which is concentric with either one of film spools 3. The length of each groove 2 is determined in accordance with the sensitivity of the charged film. In FIG. 1, longer grooves are illustrated by a numeral 2' as an example.

Figure 4:
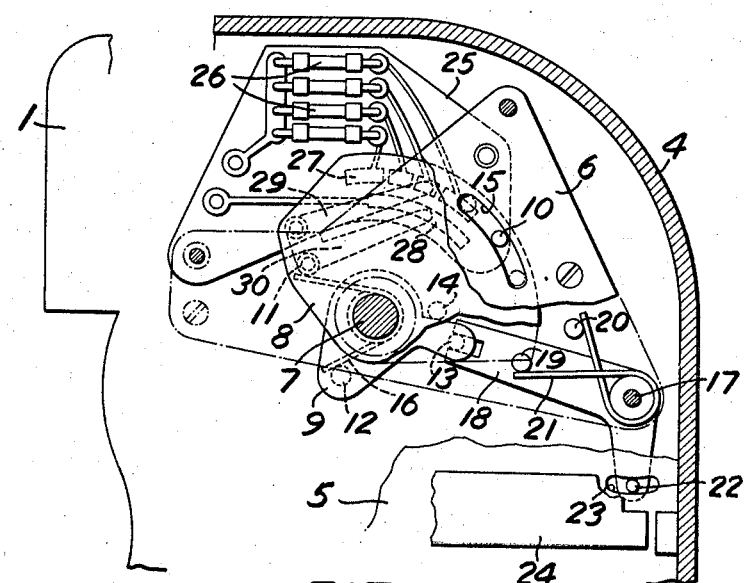
FIG. 4 shows an example of automatic exposure control mechanism of a motion picture camera adapted to co-operate with the magazine shown in FIG. 1.

The groove 2 cooperates with the automatic exposure control mechanism provided in the camera and serves to adjust said mechanism automatically in accordance with film sensitivity. FIG. 4 shows a portion of such a control mechanism which cooperates with the magazine 1 of FIG. 1.

In FIG. 4, the inner wall plate 5 is partially removed to illustrate the interior arrangement of parts, and as shown in the drawing, a shaft 7 which is mounted on the base plate secured on the inner wall plate 5 has a setting plate 8 and a lever 9 rotatably mounted thereon. The setting plate 8 has an upright pin 10 projecting into the magazine chamber through an arcuate slot 15 provided in the plates 5 and 6. A spring 16 is interposed between a pin 11 on the plate 8 and a pin 12 on the lever 9 and urges said plate 8 and said lever 9 to rotate in reverse direction with each other until the edge of the lever 9 abuts against the pin 14 provided on the plate 8. Further, the lever 9 has a pin 13 which engages with the forked end of the arm 18 pivotable about the fulcrum 17. The arm 18 has at the end remote from the forked end a pin 22 projecting through a slot 23 in the plate 5 into the magazine chamber so as to be able to engage with the hook 24 in response to locking of the cover of the camera. The arm 18 is biased by means of a spring 21 interposed between the fixed pin 20 and the pin 19 on the arm 18 so as to rotate clockwise.

The electric panel 25 disposed at the underside of the setting plate 5 has a number of resistors 26, the same number of contacts 27 one for each resistor, and a contact 28 opposed to said contacts 27. The sliding contactors 29 and 30 which are secured on the lower surface of the plate 8 move along the contacts 27 and 28 respectively upon rotation of the plate 8.

When the film magazine shown in FIG. 1 is charged in the camera, the film spool 3 aligns concentrically with the shaft 7, and the groove 2 is disposed over the slot 15. Thus, the pin 10 is slidably received in the groove 2. With these arrangements, the cover is closed and locked pressing the pin 22 toward right by the end of the hook 24. The arm is rotated counterclockwise against the action of the spring 21, thus rotating the lever 9 clockwise. This causes clockwise rotation of the setting plate 8, and the pin moves along the groove 2 until it reaches to the end thereof, where the plate 8 is prevented further rotation and continued rotation of the lever 9 causes deflection of the spring 16.

As apparent from above description, the angular position of the setting plate is determined by the groove length, and thus the electric resistance of the photoelectric circuit is adjusted in accordance with the film sensitivity.

Although the groove 2 is disposed concentrically with the film spool 3 in this embodiment, this may of course be positioned eccentrically with said film spool. Also, an infinitely variable resistor may be used in lieu of a plurality of fixed resistors in said mechanism.

FIG. 2 shows another embodiment of the present invention, in which the magazine 1 has a rectilinear groove 2 disposed adjacent to and parallel with the flat side wall 1a of the magazine 1. The groove 2, having a length corresponding to the film sensitivity, is adapted to cooperate with the automatic exposure control mechanism of the camera and serves to adjust said mechanism automatically in accordance with film sensitivity.

Figure 5:
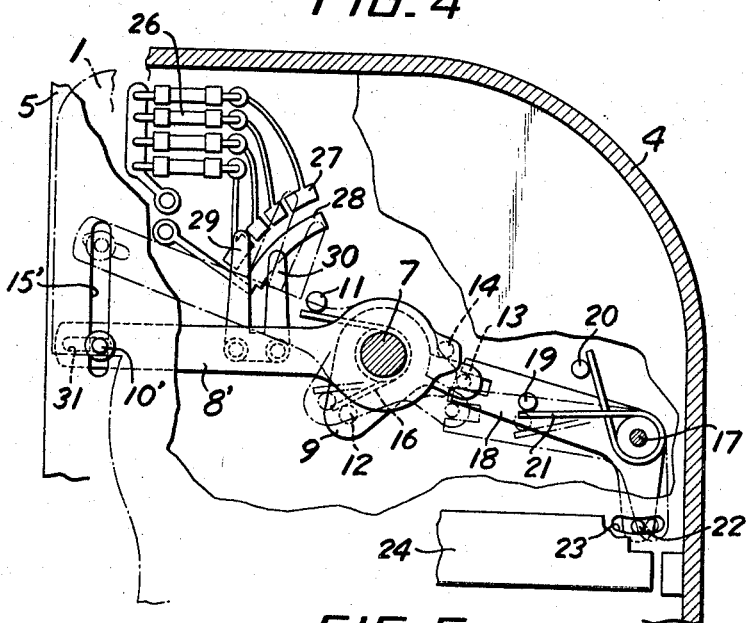
FIG. 5 shows another automatic exposure control mechanism adapted to cooperate with the magazine shown in FIG. 2.

FIG. 5 shows an example of such control mechanisms which co-operate with the magazine of FIG. 2. Basically, this mechanism is a modification of the one previously described with reference to FIG. 4 and like parts are illustrated by same numerals. As shown in FIG. 5, a lever 8' having a pair of sliding contactors 29 and 30 is used in lieu of the setting plate 8. The lever 8' has a slot 31 disposed at the outer end thereof so as to cross with the slot 15' provided in the inner wall 5 of the camera. A pin 10' is slidably mounted on the lever 8' through the slot 31 and 15' and projecting into the magazine chamber. Thus, the pin 10' can move along the slot 15' in the inner wall 5 of the camera in response to rotation of the lever 8'.

When the magazine shown in FIG. 2 is properly positioned in this camera, the groove 2 and the slot 15' are disposed to face each other, and thus the pin 10' is inserted into the groove 2 of the magazine 1. As apparent from above arrangement, the operation of this control mechanism is substantially the same as that of FIG. 4. That is, locking movement of the hook 24 urges the pin 22 toward the right causing counterclockwise rotation of the arm 18, which rotation is transmitted through the lever 9 to the lever 8' and results in clockwise rotation of the latter. During this clockwise rotation of the lever 8', the pin 10' slides in the groove 2 of the magazine until it reaches the end of the groove 2. The lever 8' is restrained against further clockwise rotation by engagement of the pin 10' with the end of the groove 2, and therefore the angular position of the lever 8' is determined by the groove length, i.e., sensitivity of charged film. Thus, electric resistance of the exposure control circuit can be automatically adjusted in accordance with film sensitivity.

In this embodiment, as the groove 2 is provided slightly apart from the film chamber, the wall thickness of the magazine is sufficient to permit provision of a deep groove and the accuracy of adjustment of said mechanism can be increased.

Figure 3:
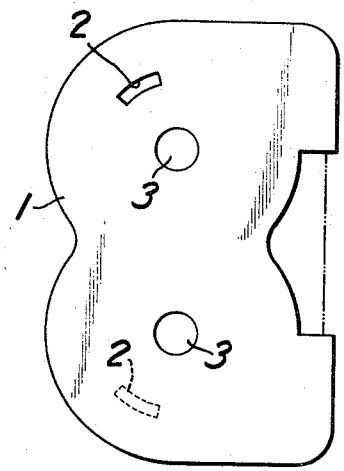
FIG. 3 is also a plan view of further embodiment of the present invention.

FIG. 3 shows a third embodiment of the present invention employed in a film magazine containing a double track film, in which the film magazine 1 has two arcuate grooves 2 disposed one on each surface. Of course, these grooves 2 may be of rectilinear shape as shown in FIG. 2.

It is to be understood that the invention is not limited to the specific embodiments herein illustrated and described, but may be used in other ways without departing from the spirit and scope thereof.

I claim:
1. An improved camera using film magazines having a straight groove displaced from the film chamber with a length discretely indicating the speed of the film, comprising control means for adjusting automatic exposure means in accordance with the speed of the film, setting means connected to said control means and biased to move along a predetermined rotary path, the position of said setting means along the path being commensurate to the sensitivity of the exposure control means, and a sensing element mounted on said setting means and coupled to said groove, said sensing element being coupled to said setting means to restrict the rotary motion thereof by an amount commensurate with the length of said groove.

2. An improved camera according to claim 1, wherein said setting means comprises a lever mounted for rotation about an axis orthogonal to the plane in which the slot is disposed, and said sensing element is radially movable relative to said axis.

3. An improved camera according to claim 2, in combination with means coupled to said setting means and restraining the motion thereof, said means being coupled to release the setting means upon closure of the camera cover.

References Cited
UNITED STATES PATENTS

| Re. 21,435 | 4/1940 | Scheibell | 352—72 X |
|---|---|---|---|
| 2,043,901 | 6/1936 | Mihalyi | 352—41 |
| 3,208,363 | 9/1965 | Easterly et al. | |
| 3,260,182 | 7/1966 | Nerwin | 95—31 |

NORTON ANSHER, Primary Examiner.

J. F. PETERS, Assistant Examiner.

U.S. Cl. X.R.

95—10, 31